United States Patent
Marchuk et al.

(10) Patent No.: US 11,611,609 B2
(45) Date of Patent: Mar. 21, 2023

(54) DISTRIBUTED NETWORK RECORDING SYSTEM WITH MULTI-USER AUDIO MANIPULATION AND EDITING

(71) Applicant: DELUXE MEDIA INC., Burbank, CA (US)

(72) Inventors: Andriy Marchuk, Santa Monica, CA (US); Gregory J. Taieb, Los Angeles, CA (US); Igor Skakovskyi, Los Angeles, CA (US); Nasik Shafeek, Kandy (LK); Serhii Brezetskyi, Kyiv (UA); Stefan Lazarevic, Belgrade (RS)

(73) Assignee: DELUXE MEDIA INC., Burbank, CA (US)

( * ) Notice: Subject to any disclaimer, the term of this patent is extended or adjusted under 35 U.S.C. 154(b) by 0 days.

(21) Appl. No.: 17/327,540

(22) Filed: May 21, 2021

(65) Prior Publication Data

US 2022/0377126 A1    Nov. 24, 2022

(51) Int. Cl.
*H04L 67/06* (2022.01)
*H04L 67/12* (2022.01)

(52) U.S. Cl.
CPC .............. *H04L 67/06* (2013.01); *H04L 67/12* (2013.01)

(58) Field of Classification Search
CPC ......... H04L 67/01; H04L 67/06; H04L 67/12; H04L 67/125; G10H 1/0058; H04N 5/222; G11B 27/031; G06F 3/165
See application file for complete search history.

(56) References Cited

U.S. PATENT DOCUMENTS

| | | | |
|---|---|---|---|
| 2006/0274166 A1 | 12/2006 | Lee et al. | |
| 2008/0092047 A1* | 4/2008 | Fealkoff | G11B 27/11 715/716 |
| 2011/0211524 A1 | 9/2011 | Holmes et al. | |
| 2012/0041759 A1* | 2/2012 | Barker | H04H 60/05 704/201 |
| 2012/0246257 A1 | 9/2012 | Brown | |
| 2015/0256613 A1 | 9/2015 | Walker et al. | |
| 2015/0296247 A1 | 10/2015 | Glasser | |
| 2016/0182855 A1* | 6/2016 | Caligor | G11B 27/031 348/14.06 |
| 2018/0047386 A1 | 2/2018 | Garner et al. | |
| 2018/0181730 A1 | 6/2018 | Lyske | |
| 2020/0228856 A1 | 7/2020 | Rivera et al. | |

* cited by examiner

*Primary Examiner* — Wing F Chan
*Assistant Examiner* — Billy H Ng
(74) *Attorney, Agent, or Firm* — Dorsey & Whitney LLP

(57) ABSTRACT

A method for editing a remote audio recording session is disclosed. The method may be performed by a server computer connected to a plurality of user computers over a communication network. The method may include receiving instructions from a first computer to edit an attribute of a first proxy audio file of a high-quality audio file at a timestamp synchronized with at least one frame of the first video clip. The method may further include merging the edit of the attribute into the high-quality audio file of the master recording session using the instructions from the first computer to edit the attribute. The method may further include transmitting the instructions received from the first computer to the second computer to edit the attribute such the second computer renders a second proxy audio file of the high-quality audio file stored in local memory of the second computer with the edit of the attribute.

20 Claims, 6 Drawing Sheets

DISTRIBUTED NETWORK RECORDING SYSTEM WITH MULTI-USER AUDIO MANIPULATION AND EDITING

CROSS REFERENCE TO RELATED APPLICATIONS

This application is related to U.S. patent application Ser. No. 17/327,373 filed 21 May 2021 entitled "Distributed network recording system with true audio to video frame synchronization"; U.S. patent application Ser. No. 17/327,467 filed 21 May 2021 entitled "Distributed network recording system with single user control"; and U.S. patent application Ser. No. 17/327,440 filed 21 May 2021 entitled "Distributed network recording system with synchronous multi-actor recording", each of which is hereby incorporated herein by reference in its entirety.

FIELD

The described embodiments relate generally to systems and methods to capture audio for use with media content, such as video content.

BACKGROUND

Audio recording sessions are carried out to digitally record voice-artists for a number of purposes including, but not limited to, foreign language dubbing, voice-overs, automated dialog replacement, or descriptive audio for the visually impaired. Recording sessions are attended by the actors/performers, one or more engineers, other production staff, and producers and directors. The performer watches video playback of the program material and reads the dialog from a script. The audio is recorded in synchronization with the video playback to replace or augment the existing program audio. Such recording sessions typically take place in a dedicated recording studio. Participants all physically gather in the same place. Playback and monitoring is then under the control of the engineer. In the studio, the audio recording is of broadcast or theater technical quality. The recorded audio is also synchronized with the video playback as it is recorded and the audio timeline is captured and provided to the engineer for review and editing.

The information included in this Background section of the specification, including any references cited herein and any description or discussion thereof, is included for technical reference purposes only and is not to be regarded subject matter by which the scope of the invention as defined in the claims is to be bound.

SUMMARY

The systems and methods described in the present disclosure enable remote voice recording synchronized to video using a cloud-based virtual recording studio within a web browser to record and review audio while viewing the associated video playback and script. All assets are accessed through or streamed within the browser application, thereby eliminating the need for the participants to install any applications or store content locally for later transmission. Recording controls, playback/record status, and audio timeline and script edits are synchronized across participants and may be controlled for all participants remotely by a sound engineer so that each participant sees and hears the section of the program being recorded and edited at the same time.

In one example, a method for editing a remote audio recording session performed by a server computer is disclosed. The computer server may be connected to a plurality of user computers over a communication network. The method includes generating a master recording session comprising a first video clip and a first high-quality audio file corresponding to the first video clip. The first video clip and the first high-quality audio file are stored in a central database accessible by the server computer. The method further includes providing access to the master recording session over the communication network to a first computer corresponding to a first user and a second computer corresponding to a second user. The first computer and the second computer are at different physical locations from each other and from the server computer. The method further includes receiving instructions over the communication network from the first computer to edit an attribute of a first proxy audio file of the high-quality audio file at a timestamp synchronized with at least one frame of the first video clip. The method further includes merging the edit of the attribute into the high-quality audio file of the master recording session using the instructions from the first computer to edit the attribute. The method further includes transmitting the instructions received from the first computer to the second computer to edit the attribute such that the second computer renders a second proxy audio file of the high-quality audio file stored in local memory of the second computer with the edit of the attribute.

In another example, the method may further include, before receiving instructions over the communication network from the first computer to edit the attribute of the high-quality audio file, generating the first proxy audio file of the high-quality audio file and sending the first proxy audio file to the first computer for local storage on the first computer. The instructions for the edit to the attribute are generated using the first proxy audio file. The edit of the attribute may be associated with the timestamp by the first computer.

In another example, the method further includes merging the edit of the attribute into the master recording session to generate updated metadata of the master recording session. In this regard, the method may further include storing the updated metadata in the central database. The attribute may include a track characteristic, an audio clip characteristic, a script event characteristic, or a video characteristic, among other characteristics and properties.

In another example, the method further includes receiving instructions over the communication network from the first computer or a third computer to initiate a recording function on the second computer. The method may further include transmitting the instructions received from the first computer or the third computer to the second computer to initiate the recording function at the second computer. The method may further include receiving from the second computer a second high-quality audio file recording of sound created by the second user corresponding to a second video clip record by the second computer and stored in local memory on the second computer before transmission to the server computer. The second high-quality audio file may include a second timestamp synchronized with another at least one frame of the second video clip different than the at least one frame of the first video clip. In some cases, receiving the second high-quality audio file recording of sound created by the second user occurs substantially concurrently with the receiving instructions over the communication network from the first computer to edit an attribute of the first proxy audio file.

In another example, receiving instructions over the communication network from the first computer or the third computer to initiate a recording function on the second computer further includes receiving instructions over the communication network from the first computer or the third computer to active a microphone and begin playback of the video clip on the second computer. Additionally, transmitting the instructions received from the first computer or the third computer to the second computer to initiate the recording function at the second computer further includes transmitting the instructions received from the first computer or the third computer to the second computer to activate the microphone and begin playback of the video clip. In this regard, the method may further include receiving instructions from the first computer or the third computer to deactivate the microphone, halt playback of the video clip, and cease the recording function on the second computer. Additionally, the method may further include transmitting the instructions received from the first computer or the third computer to the second computer to deactivate the microphone, halt playback of the video clip, and cease the recording function on the second computer.

In another example, receiving the second high-quality audio file further includes receiving the second high-quality audio file in segments serially and at least partially during playback of the video clip. The high-quality audio file may be recorded at a sample rate of at least 48 kHz and a resolution of at least 24 bits per sample.

In another example, a method for editing a remote audio recording session on a first computer associated with a first user is disclosed. The method includes connecting to a server computer via a communication network and engaging in a master recording session managed by the server computer. The master recording session includes a video clip and a high-quality audio file corresponding to the video clip that are stored in a central database accessible by the server computer. The method further includes receiving a transmission of a first proxy audio file of the high-quality audio file over the communication network from the server computer. The method further includes editing an attribute of the first proxy audio file and updating metadata associated with the first proxy audio file of the high-quality audio file in a local memory of the first computer. The method further includes transmitting instructions over the communications network to the server computer to merge the edit of the attribute into the high-quality audio file of the master recording session of the server computer.

In another example, the method further includes synchronizing the edit of the attribute to a timestamp of at least one frame of the video clip. In this regard, transmitting instructions over the communications network to the server computer to merge the edit of the attribute into the high-quality audio file of the master recording session of the server computer may further include transmitting the timestamp to the server computer. Further, the transmitted instructions of the first computer may cause the server computer to merge the edit of the attribute according to the timestamp.

In another example, the editing of the attribute of the high-quality audio file occurs in response to a manual input received from the first user within a browser program of the first computer. The attribute may include a track characteristic, an audio clip characteristic, a script event characteristic, or a video characteristic.

In another example, the transmitted instructions of the first computer cause the server computer to generate updated metadata of the master recording session based on the transmitted instructions of the first computer. The transmitted instructions of the first computer may further cause the server computer to store the updated metadata in the central database.

In another example, the master recording session may be accessed over the communication network by a second computer corresponding to a second user. The first computer and the second computer are at different physical locations from each other and from the server computer. In some cases, the transmitted instructions of the first computer cause the server computer to transmit instructions over the communications network to a second computer to render a second proxy audio file of the high-quality audio file stored in local memory of the second computer with the edit of the attribute from the first computer. Further, the transmitted instructions of the first computer may cause the server computer to transmit instructions over the communications network to the second computer to render the second proxy audio file of the high-quality audio file while the second computer generates another high-quality audio file for the master recording session.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
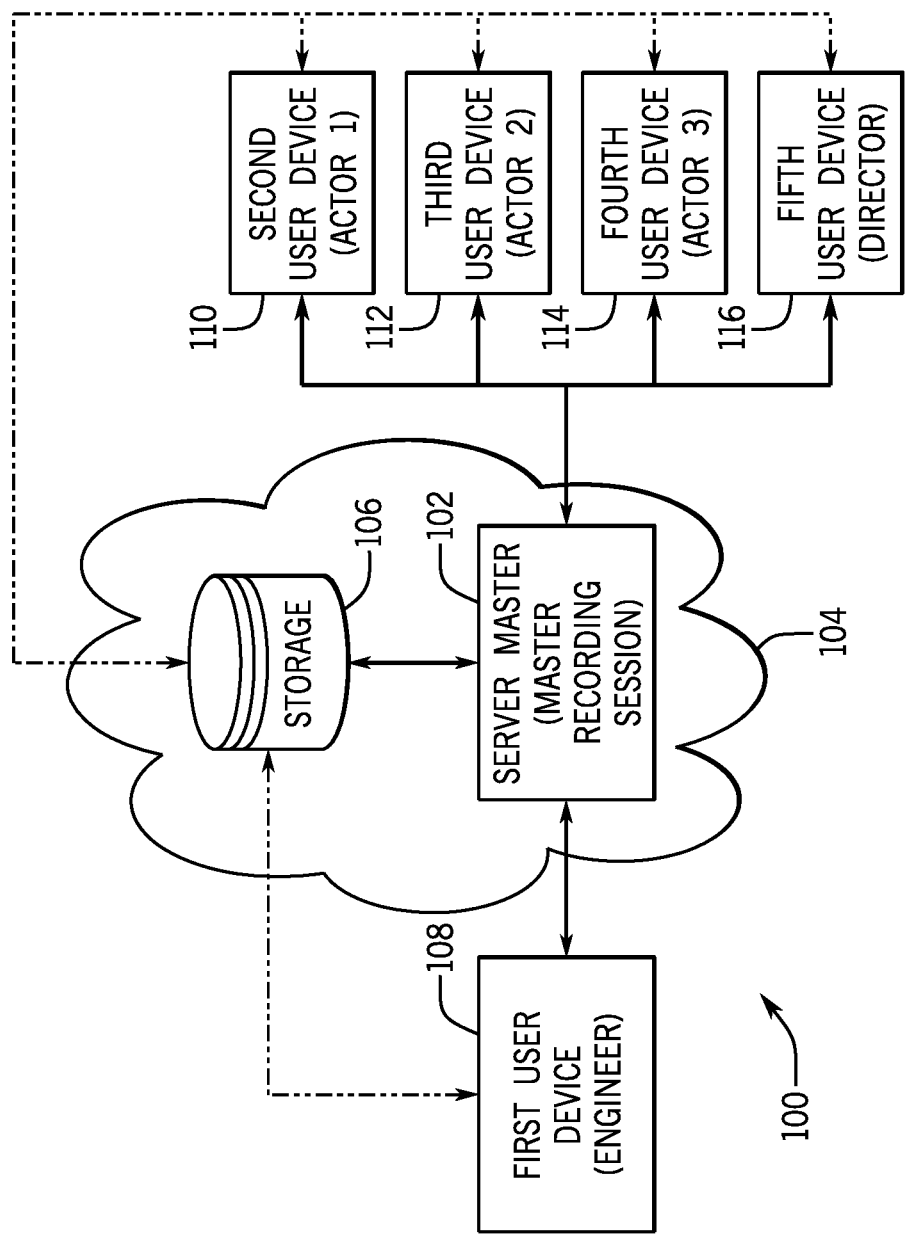
FIG. 1 depicts a schematic diagram of an embodiment of a system for conducting a remote audio recording session synchronized with video.

The description that follows includes sample systems, methods, and apparatuses that embody various elements of the present disclosure. However, it should be understood that the described disclosure may be practiced in a variety of forms in addition to those described herein.

In the post-production process of film and video creation, the raw film footage, audio, visual effects, audio effects, background music, environmental sound, etc. are cut, assembled, overlayed, color-corrected, adjusted for sound level, and subjected to numerous other processes in order to complete a finished film, television show, video, or other audio-visual creation. As part of this process, a completed film may be dubbed into any number of foreign languages from the original language used by actors in the film. Often a distributed workforce of foreign freelance translators and actors are used for foreign language dubbing. In such scenarios, the translators and foreign language voice actors often access video, and/or other media content, and audio files and technical specifications for a project through a web-based application that streams the video to these performers for reasons of security to prevent unauthorized copies of the film to be made. The foreign language actors record their voice performances through the web-based application. Often these recordings are performed without supervision by a director or audio engineer. Further, the recording quality through web-based browser applications is not of industry standard quality because the browser applications downsample and compress the recorded audio for transmission to a secure server collecting the voice file.

Other post-production audio recording needs arise when the original audio recording is faulty for some reason. For example, unwanted environmental noises (e.g., a car alarm) were picked up by the microphone during an actor's performance, sound levels were too low (or too high), the director ultimately did not like the performance by the actor in a scene, etc. Bringing actors, directors, audio engineers, and others back together post production to a studio to fix audio takes in scenes is expensive and time consuming. However, it is usually the only way to achieve a full, high-resolution audio recording. Similar to the issues with foreign language audio dubbing described above, attempts to record remotely over a network have been performed with lossy compression files, such as Opus, to allow for low latency in transmission in an attempt to achieve approximate synchronization with the corresponding video frames. However, bandwidth and hardware differences can cause a greater delay due to buffering for one actor but not for another such that the dialog each records is not in synch with the other. There is always some lag due to the network bandwidth limitations on either end as well as encoding, decoding, and compressing the audio files. Thus, synchronization is generally not achieved and an audio engineer must spend significant time and effort to properly synchronize the audio recordings to the video frames. Also, sound captured and transmitted by streaming technologies is compressed and lossy; it cannot be rendered in full high-resolution, broadcast or theater quality. Further, if a director is involved in managing the actor during the audio dubbing process, there is usually a discrepancy between the streaming video playback viewed by the director and the streaming sound file received from the actor. The audio is out of synch with the video and the director is unable to determine whether the audio take synchronizes with the lip movement of the actor in the film content and whether another take is necessary.

The distributed network recording system disclosed herein addresses these problems and provides true synchronization between the audio recorded by the actor and the frames of the film content being dubbed. The system provides for the frame-synchronized recording of lossless audio files in full 48 kHz/24 bit sound quality, which is the film industry standard for high-quality recorded audio files. As described in greater detail herein, the system controls a browser application on an actor's personal computer to record and cache a time-stamped, frame-synchronized, lossless, audio file locally and then upload the lossless audio file to a central server. The system further allows for immediate, in-session review of the synchronized audio and video among all session participants to determine whether a take is accurate and acceptable or whether additional audio recording takes are necessary. This functionality is provided by sending a compressed, time-stamped proxy audio file of the original lossless recording to each user device participating in the recording session, e.g., an audio engineer, multiple actors, a director, etc. The proxy audio file can be reviewed, edited, and manipulated by the participants in the recording session and final time synchronized edit information can be saved and associated with the original, lossless audio file to script the final audio edit for the dubbed film content. Additional detailed description of this process is provided further herein.

An exemplary distributed network recording system 100 for capturing high-quality audio from a remotely located actor is depicted in FIG. 1. The system 100 is controlled by a computer server 102 that instantiates a master recording session. The computer server 102 also acts as a communication clearinghouse within the communication network 104, e.g., the Internet "cloud," between devices of the various participants in the master recording session. The computer server 102 may be a single device that directly manages all communications with the participant devices or it may be a collection of distributed server devices that work in cooperation with each other to enhance speed of delivery of data, e.g., primarily video/audio files to each of the participant devices. For example, the computer server 102 may comprise a host server that manages service to and configuration of a web browser interface for each of the participant devices. Alternatively, the computer server 102 may be in the form of a scalable cloud hosting service, for example, Amazon Web Services (AWS). In addition, the computer server 102 may include a group of geographically distributed servers forming a content delivery network (CDN) that each store a copy of the video files, and/or other media content, used in the master recording session. Geographic distribution of the video files allows for lower time latency in the streaming of video files to participant devices.

The server 102 is also connected to a storage device 106 that provides file storage capacity for recorded audio files, proxy audio files as further described below, metadata collected during a recording session, a master digital video file of the film being dubbed, application software objects and modules used by the computer server 102 to instantiate and conduct the master recording session, and other data and media files that may be used in a recording session. As with the computer server 102, the storage device 106 may be a singular device or multiple storage devices that are geographically distributed, e.g., as components of a CDN.

A number of participant or user devices may be in communication with the computer server 102 to participate in the master recording session. For example, each of the user devices may connect with the computer server over the Internet through a browser application by accessing a particular uniform resource locator (URL) generated to identify the master recording session. A first user device 108 may be a personal computer at a remote location associated with an audio engineer. As described further herein, the audio engineer may be provided with credentials to primarily control the master recording session on user devices of other participants. A second user device 110 may be a personal computer at a remote location associated with a first actor to be recorded as part of the master recording session. A third user device 112 may be a personal computer at a remote location associated with a second actor to be recorded as part of the master recording session. A fourth user device 114 may be a personal computer at a remote location associated with a third actor to be recorded as part of the master recording session. A fifth user device 116 may be a personal computer at a remote location associated with a director of the film reviewing the audio recordings made by the actors and determining acceptability of performances during the master recording session.

As indicated by the solid communication lines in FIG. 1, the user devices 108-116 all communicate with the computer server 102, which transmits control information to each of the user devices 108-116 during the master recording session. Likewise, each of the user devices 108-116 may transmit control requests or query responses to the computer server 102, which may then forward related instructions to one or more of the user devices 108-116 (i.e., each of the user devices 108-116 is individually addressable and all are collectively addressable). Session data received from any of the user devices 108-116 received by the computer server 102 may be passed to the storage device 106 for storage in memory. Additionally, as indicated by the dashed communication lines in FIG. 1, each of the user devices 108-116 may receive files directly from the storage device 106 or transmit files directly to the storage device 106, for example, if the storage device 106 is a group of devices in a CDN. For example, the storage device 106 in a CDN configuration may directly stream the video film contents being dubbed or proxy audio files as further described herein to the user devices 108-116 to reduce potential latency in widely geographically distributed user devices 108-116. Similarly, the user devices 108-116 may upload audio files created locally during the master recording session directly to the storage device 106, e.g., in a CDN configuration at the direction of the computer server 102.

Figure 2:
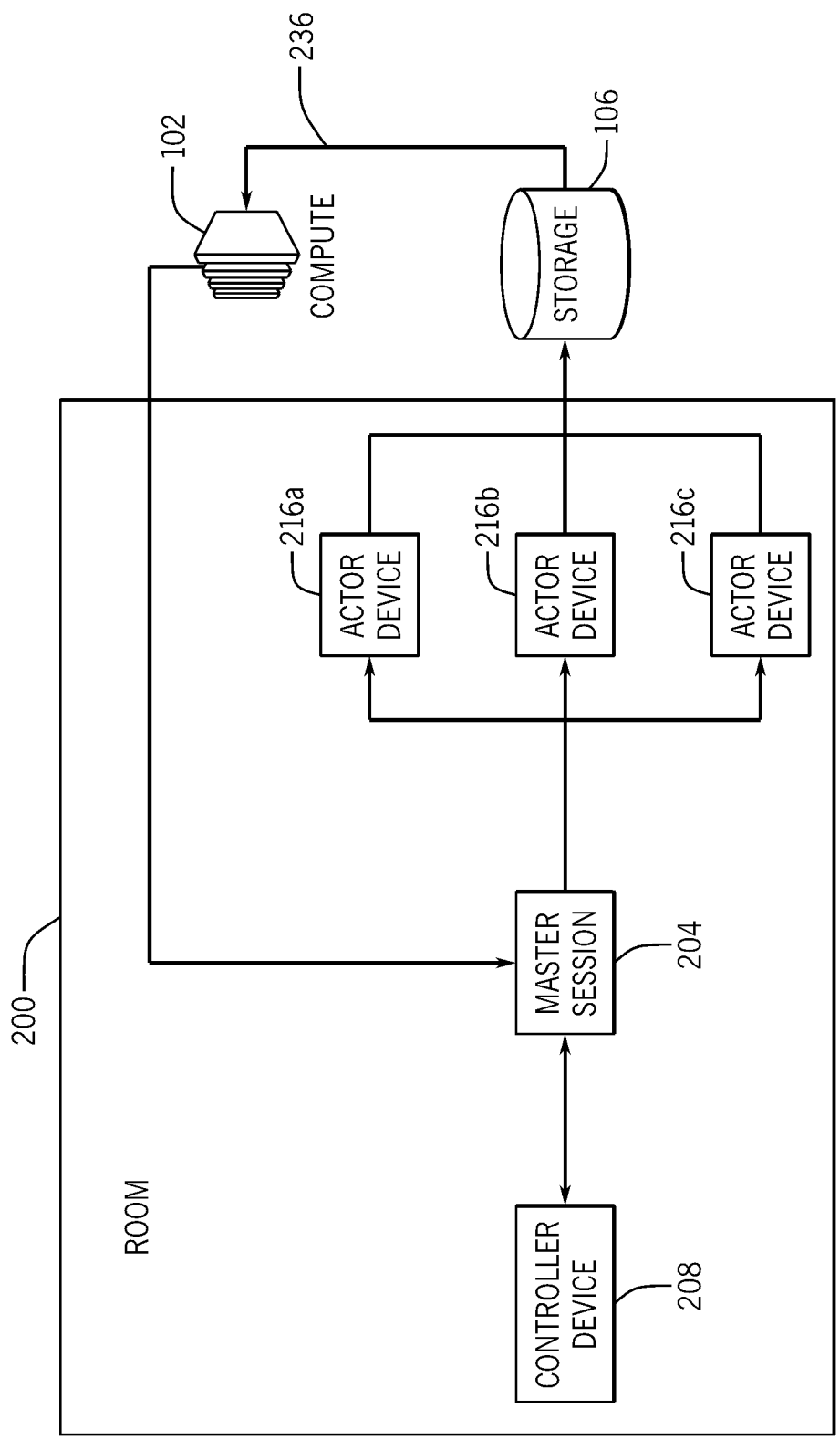
FIG. 2 depicts a schematic diagram of communication during a master recording session for the system of FIG. 1.

FIG. 2 illustrates a diagram of communication during a master recording session for the system 100. With reference to FIG. 2, in one embodiment, a controller device 208 may begin a master recording session 204, such as assigning a particular media content (e.g., movie, video clip, or the like) from storage 106 to be used with the audio to be captured. A controller device 108 may be a personal computer or other computing device (e.g., tablet, smartphone, etc.) at a remote location associated with an audio engineer or master session controller. The audio engineer may be provided with credentials or other access control permissions to primarily control the master recording session, which may allow the controller to initiate playback, for example, on the user devices as part of the master recording session. The controller device 208 may also determine or retrieve other information to be used with the master recording sessions, e.g., dialogue prompts, actor information, and the like.

Once the master recording session is activated, actor device 216a-216c can access the master recording session 204. The actor devices 216a-216c may include or be substantially analogous to the user devices 110-114 described above with reference to FIG. 1. The actor devices 216a-216c may navigate to a URL via a web browser, where the URL points to the location on the server 102 for the master recording session information. In some embodiments, the actor device 216a-216c may be prompted to enter credentials (e.g., login information) to access the master recording session. Once accessed, the actor devices 216a-216c may be joined with the controller device 208 in a virtual recording room 200. The actor devices 216a-216c will present a user interface corresponding to the master recording session and optionally personalized to the particular user roles (e.g., actor, director, controller). For example, the actor user interface may include a location for dialogue prompts for dialogue assigned to that actor, whereas the director interface may include icons or other features specific to the director role.

The controller device 208 may then initiate playback for the video content. As this occurs, the various actor devices 216a-216c may begin playback of the video content as it is streamed or otherwise transmitted via the network 104 from the storage 106 and/or server 102. It should be noted that due to bandwidth issues, distance, device characteristics, or the like, the playback of the video content may begin at different times, e.g., a first user device may begin playback at 8:00:00 am Pacific Time and a second user device may begin playback at 8:00:04 am Pacific Time due to the second user having a lagging WiFi connection. In other instances, the playback may occur simultaneously or substantially simultaneously. As will be discussed in more detail below, despite the differences in actual playback time audio that may be recorded with respect to the video content may be synchronized to a standard time.

In some instances, the video content playback may not include audio, in other embodiments, the playback may include a playback audio clip, which may include music, environmental noises, dialogue, or the like. In some instances, the master session may also include audio that may be separate from the video content, e.g., audio from the controller device 208 and/or other actor devices 216a-216c may be transmitted via the master session. In other instances, the audio and/or video (e.g., camera images) may be transmitted in a separate session or platform (e.g., video conferencing platform) that may be operated in conjunction with the master recording session.

During playback of the video content, the controller device 208 may selectively activate microphones on the various actor devices 216a-216c. In instances where the playback of the video content may also include audio, the controller device 108 may selectively deactivate a sound device for the various user devices (e.g., speakers) or other audio output in order to prevent contamination of the recording. Alternatively or additionally, the audio output for the user devices may be configured to reduce the audio being received at the local microphones, e.g., the audio output devices may be headphones.

The controller device 208 may activate a microphone for a particular actor based on the actor having an audio contribution, e.g., dialogue, coming up or at a particular frame. Once activated and at the appropriate time or video frame, the actor may produce the audio contribution, e.g., speak dialogue. The audio is captured locally by the actor device 216a. At the same time and/or at other times during the video content playback, the other actors may also generate their respective audio contributions, which may be captured locally on the other actor devices 216b, 216c. The actor devices 216a-216c may store the audio contributions as audio clips and transmit the audio clips or audio files to the storage 106 and/or server 102. In some embodiments, the other actors may be able to hear the contributions in real time (e.g., via the secondary session) or via the master recording session audio playback. In other embodiments, some actors may not be able to hear other actors and their contributions until a compilation or other playback is generated. The audio clips may be stored in a manner that prevents access by the users, e.g., may be encrypted and optionally may be stored such that they may be deleted after a predetermined time period or event. In one embodiment, the clips may be stored in a cache corresponding to the browser and the cache may be deleted upon closing of the master recording session tab or browser window.

The audio clips may be transmitted during recordation, e.g., at discrete intervals, and/or after the audio contribution or video playback has ended. In some embodiments, the controller device 208 can instruct commands to the actor devices 216a-216c to upload the audio clips.

With continued reference to FIG. 2, the audio files may be transmitted from the various actor devices 216a-216c and placed in storage 106. The audio files may include time-stamp or other metadata that may provide synchronization information to synchronize the audio files back to a particular time of the video content. For example, the audio files may include an activation time when the controller device 208 activated the microphone, where the time may be relevant to the local playback time of the video content, e.g., a video frame timestamp, rather than the actual playback time of the master session video playback. That is, the timestamp information may correspond to a video timeline, rather than a time of day.

After capture, the audio files or associated metadata may be edited, reformatted, or the like. Additionally, the audio files can be play backed as part of the master recording session, e.g., compilation playback, where the audio files are played synchronized to the video content. Alternatively, the audio files may be played separately from the video content, e.g., the secondary session. However, in many instances, the controller may command recordation, the audio files may be captured, and then a playback of the captured audio files may be presented to determine if additional recordings should be done. In many instances, the playback of the audio files may be from the storage location 106, rather than the local devices, since the local actor devices 216a-216c may not retain copies of the audio files. Additionally, the audio files in storage 106 may be the full files as originally captured, e.g., not include edits or the like. In these instances, the server 102 may modify the audio files before playback to apply edits, the time start with the video content, or the like.

Figure 3:
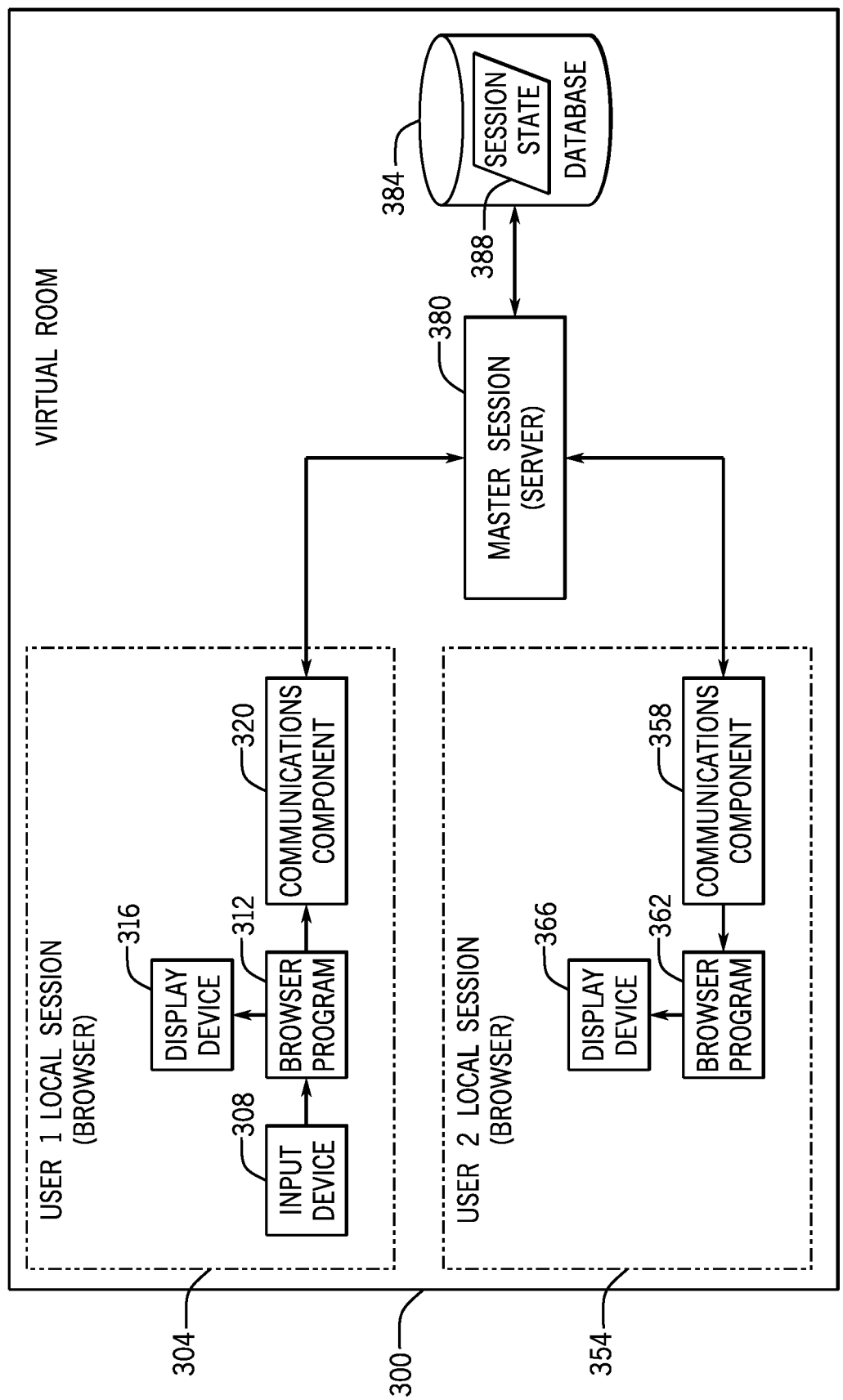
FIG. 3 depicts a schematic diagram of editing an attribute of a master recording session.

FIG. 3 depicts a schematic diagram of editing an attribute of a master recording session. With reference to FIG. 3, in one embodiment, a virtual room 300 is shown including a first local session 304 and a second local session 354. The local sessions 304, 354 may be, or operate by, remote browser sessions operating on user devices that are at different physical locations from each other. In this regard, the first local session 304 may correspond to a first user and the second local session 354 may correspond to a second user. The first user of the first local session 304 may be a controller or editor-type user, similar to the controller user and device 208 described above with reference to FIG. 2. The second user of the second local session 354 may be an actor user, such as any of the users of the actor device 216a-216c described above. The systems and methods described herein may permit the first user to edit a master recording session by causing edits to a high-quality audio via a local, compressed version of the audio associated with the first local session 304. The systems and methods described herein may permit the first user to edit the master recording session concurrent with the second user or other user recording additional audio for the master recording session. As such, the first, controller user may edit a first audio file, while the second, actor user may record a second, subsequent audio file. The systems and methods of FIG. 3 may therefore enhance efficiencies of the distributed recording and editing process, in part, by allowing the controller to edit the audio in substantially real-time and while further recording is ongoing from other users. This may mitigate or prevent the need for additional recording sessions, as the controller user or editor may identify and correct issues during the initial recording session.

To facilitate the foregoing, FIG. 3 shows the first local session 304 including an input device 308, a browser program 312, a display device 316, and a communications component 320. The input device 308 may allow the first, controller user to enter data into the browser program 312, as well as provides an input to communicate with other devices or services, such as with a server 380. The input device 308 can include one or more input buttons, touch pads, and so on. The browser program 312 may include any appropriate application that is capable of accessing the internet. The browser program 312 may use an URL to point to a location, such as the server 380 for accessing and transmitting information associated with the master recording session. The browser program 312 may be used to provide the user with an interface to the master recording session in order to perform the various methods described herein. In this regard, the browser program 312 may include or otherwise be associated with hardware of the local device and/or a browser protocol (e.g., Websocket, HTTP, or the like).

The display device 316 provides visual feedback to a user. Optionally, the display device 316 may act as an input element to enable a user to control, manipulate, and calibrate various components of the first local session 304. The display device 316 may be a liquid crystal display, plasma display, organic light-emitting diode display, and/or other suitable display associated with the hardware of the local computer. The communications component 320 provides communication to and from the first local session 304 to other devices and/or the server 380. The communications component 320 manages one or more communication protocols, such as, but not limited to HTTP, TCP, and so on. The second local session 354 may also include a communications component 358, a browser program 362, and a display device 366, redundant explanation of which is omitted herein for clarity.

The virtual room 300 is shown in FIG. 3 as including the server 380 and the database 384. The server 380 and the database 384 may be substantially analogous to the server 102 and the database 106 described above with respect to FIG. 1. The database 384 is shown as including a session state 388. The session state 388 may include information associated with a master recording session, including pointers to previously recorded high-quality audio files and metadata related to editing actions related to the audio files.

The browser program 312 may include one or more attributes of the master recording session 380 that are editable by a user, such as a controller user associated with the first local session 304. While many attributes are possible and contemplated herein, in one example, the editable attributes of the master recording session may include a track characteristic, an audio clip characteristic, a script event characteristic, and/or a video characteristic, among others. The track characteristic may include various properties associated with an overall production of an audio clip, including a track name, a track volume, a track mute, and/or a solo property. The audio clip characteristic may include various properties associated with recorded audio of the master recording session, such as recorded audio from a user, including an audio presentation, an audio volume, an audio trim, an audio fade, an audio timecode, or an audio duration property. The script event characteristic may include various properties associated with the script or lines for an actor, including a script text, a script character, a script timecode, or a script duration property. The video characteristic may include various properties associated with the video clip of the master recording session, including a video volume, a video mute, or a video timecode property. It will be appreciated that the foregoing attributes and characteristic are presented as example attributes and characteristics of the master recording session which may be edited, in other cases, more or fewer or different attributes or characteristics may be used.

In the example of FIG. 3, the first, controller user of the first local session 304 may edit attributes of the master recording session. The edits to the master recording session may be propagated to other users, e.g., the second, actor user of the second local session 354 such that the other users may receive information corresponding to the edited attribute in substantially real-time. To illustrate, the first, controller user may receive a first proxy audio file of the high-quality audio file from the server 380. The first proxy audio file may include or otherwise be a compressed audio file of the master recording session. For example, the first proxy audio file may include a compressed audio file corresponding to a high-quality audio file that has been previously recorded by another remote user, such as the second, actor user of the second local session 354. The first proxy audio file may be stored locally with the first user, such as in cache or other temporary memory, which may be associated with the browser program 312. The first proxy audio file may include various attributes or states, such as those described above with respect to the session state 388.

The first local session 304 may provide an environment in which the first, controller user can edit metadata associated with the first proxy audio file, which edits are captured as session state changes propagated to the server 380 and other user devices 354 in the virtual room 300. For example, the edits may also be saved as updated metadata and ultimately stored as part of the metadata of the master audio recording, which has an industry standard multimedia format such as AAF. For example, the first local session 304 may provide an environment in which the first, controller user can edit the metadata of the first proxy audio file that is stored locally and accessible by the browser program 312. Within the first local session 304, the first, controller user may initiate a manual operation that causes an edit to one or more of the attributes of the first proxy audio file using the associated metadata. For example, the first, controller user may manipulate the input device to edit the track characteristic, an audio clip characteristic, a script event characteristic, video characteristic, and/or other attribute or characteristic.

The manual input including information associated with editing the attribute may be communicated to the browser program 312. The browser program 312 may access the first proxy audio file and change the first proxy audio file based in the manual input received at the input device 308. As one example, the browser program 312 may include a first proxy audio file of the high-quality audio file with a state of the audio volume at a first volume. The input device 308 may receive an input from the first, controller user associated with a request to increase the audio volume from a first volume to a second volume. The browser program 312 may receive the request and update the first computer state locally such that the audio volume has a state associated with the second volume. The browser program 312 may provide an indication of the change in the first local session 304 at the display device 316.

The first local session 304 may further provide an environment for the first, controller user to cause an update to metadata associated with the master recording session, using the edited metadata of the first proxy audio file. For example, the edit of the attribute to the first proxy audio file may be associated with a first timestamp. The first timestamp may be a timestamp of a particular scene or clip of the video at which the edit to the attribute applies, e.g., such as editing a volume of a particular scene. The communications component 320 may transmit information over the communications network including the edit to the attribute, as associated with the first timestamp of the edit. For example, the communication component 320 may communicate instructions to the server 380 that prompt the server 380 to store editing metadata regarding the attribute of the high-quality audio file that is stored at the database 384. Continuing the non-limiting example of the first and second audio volumes above, the server 380 may store the change information to the audio volume of the master recording session from the first volume to the second volume in the database 384 to update the stored master recording session. In this manner, the first local session 304 is able to edit metadata associated with the master session using the first proxy audio file. Editing the metadata associated with first proxy audio file in the first local session 304 serves as a proxy for the master session, without the local session necessarily having access to, or have downloaded the full, high-quality audio file from the server 380.

Once the change to the metadata of the master session is received and merged at the server 380, additional users and client devices may receive information including the edited attribute. For example, the server 380 may be configured to transmit instructions to update a second proxy audio file of the high-quality audio file at the second local session 354 to include the edit to the attribute. In some cases, the instructions may cause metadata associated with the second proxy audio file to be updated such that the second proxy audio file reflects the edit to the attribute. The second proxy audio file may be a compressed audio file of the master recording session that is stored locally with the browser program 362 of the second local session 354. The second proxy audio file may be associated with previously recorded audio of the master recording session, such as the previously recorded audio of the master recording session that the first, controller user has edited in the first local session 304. In this regard, initially, the second proxy audio file may have a first volume at the first timestamp. As stated above, the master recording session is updated, using the updated first proxy audio file, to include a second volume that is greater than the first volume at the first timestamp. As such, the server 380 may be configured to communicate to the second local session 354 that the metadata of the second proxy audio file should also reflect the second proxy audio filing having a second volume at the first timestamp. The second local session 354 therefore may receive the instructions from the server 380 at the communications component 358. The browser program 362 may access the second proxy audio file that is stored locally and update the second proxy audio file is rendered to include the second volume. A confirmation of this change may be communicated at the display device 366.

In operation, the edit of the attribute in the first local session 304 may occur during or substantially simultaneity with the second, actor user recording additional audio in the second local session 354. For example, the second local session 354 may initiate a recording function for the second, actor user to record subsequent high-quality audio for the master recording session, according to the techniques described herein. The first proxy audio file may be associated with previous high-quality audio recorded by the second, actor user. The first, controller user may edit the attribute of the first proxy audio file, as described above, notwithstanding the recording function of the second local session 354. In this manner, the editing operation of the first local session 304 may not impeded or prevent the recording of additional high-quality audio. Nor does the recording of additional high-quality audio impede or prevent the editing of the previous audio. The systems and techniques described herein therefore present the concurrent multi-user functionality of editing and recording, which may promote more efficient operation in a distributed working environment, among other benefits.

Figure 4:
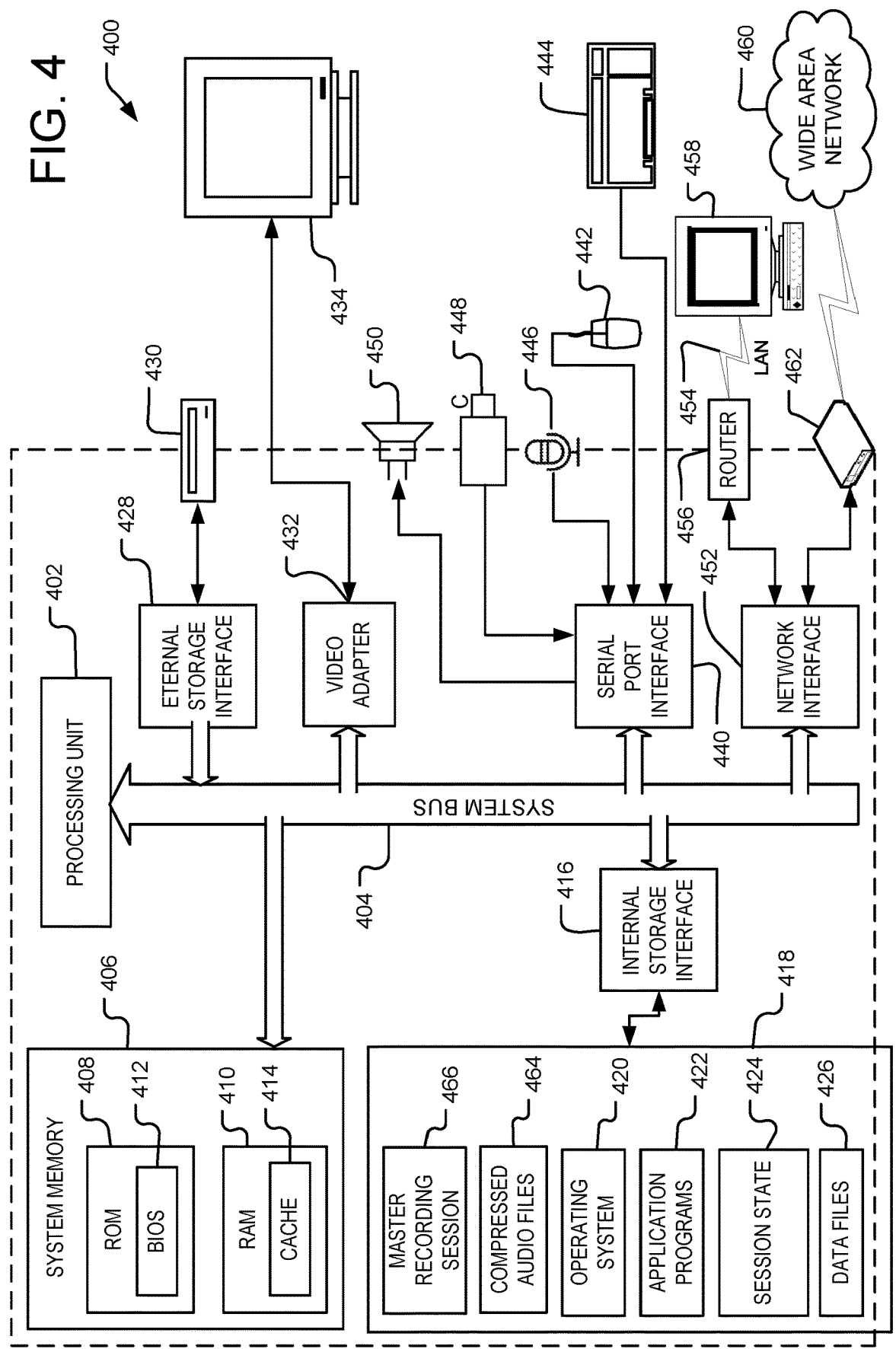
FIG. 4 depicts a schematic diagram of a computer system that may be either a server computer or a client computer configured for implementing aspects of the recording system disclosed herein.

An exemplary computer system 400 for implementing the various techniques described herein is depicted in FIG. 4. The computer system of a sender or a recipient (e.g., an engineer, editor, actor, director, etc.) may be a personal computer (PC), a workstation, a notebook or portable computer, a tablet PC, or other device, with internal processing and memory components as well as interface components for connection with external input, output, storage, network, and other types of peripheral devices. The server computer system may be one or more computer devices providing web services, database services, file storage and access services, and application services among others. Internal components of the computer system in FIG. 4 are shown within the dashed line and external components are shown outside of the dashed line. Components that may be internal or external are shown straddling the dashed line.

Any computer system 400, regardless of whether configured as a personal computer system for a user, or as a computer server, includes a processor 402 and a system memory 406 connected by a system bus 404 that also operatively couples various system components. There may be one or more processors 402, e.g., a single central processing unit (CPU), or a plurality of processing units, commonly referred to as a parallel processing environment (for example, a dual-core, quad-core, or other multi-core processing device). The system bus 404 may be any of several types of bus structures including a memory bus or memory controller, a peripheral bus, a switched fabric, point to point connection, and a local bus using any of a variety of bus architectures. The system memory 406 includes read only memory (ROM) 408 and random access memory (RAM) 410. A basic input/output system (BIOS) 412, containing the basic routines that help to transfer information between elements within the computer system 400, such as during start up, is stored in ROM 408. A cache 414 may be set aside in RAM 410 to provide a high speed memory store for frequently accessed data.

A local internal storage interface 416 may be connected with the system bus 404 to provide read and write access to a data storage device 418 directly connected to the computer system 400, e.g., for nonvolatile storage of applications, files, and data. The data storage device 430 may be a solid-state memory device, a magnetic disk drive, an optical disc drive, a flash drive, or other storage medium. A number of program modules and other data may be stored on the data storage device 418, including an operating system 420, one or more application programs 422, and data files 424. In an exemplary implementation, the data storage device 418 may store the master recording session 466, compressed audio file 464, session state data 424 according to the exemplary processes described herein above. Note that the data storage device 418 may be either an internal component or an external component of the computer system 400 as indicated by the data storage device 418 straddling the dashed line in FIG. 4. In some configurations, there may be both an internal and an external data storage device 418.

The computer system 400 may further include an external data storage device 430. The data storage device 430 may be a solid-state memory device, a magnetic disk drive, an optical disc drive, a flash drive, or other storage medium. The external storage device 430 may be connected with the system bus 404 via an external storage interface 428 to provide read and write access to the external storage device 430 initiated by other components or applications within the computer system 400. The external storage device 430 (and any associated computer readable media) may be used to provide nonvolatile storage of computer readable instructions, data structures, program modules, and other data for the computer system 400. Alternatively, the computer system 400 may access remote storage devices (e.g., "cloud" storage) over a communication network (e.g., the Internet) as further described below.

A display device 434, e.g., a monitor, a television, or a projector, or other type of presentation device may also be connected to the system bus 404 via an interface, such as a video adapter 440 or video card. In addition to the monitor 442, the computer system 400 may include other peripheral input and output devices, which are often connected to the processor 402 and memory 406 through the serial port interface 444 that is coupled to the system bus 406. Input and output devices may also or alternately be connected with the system bus 404 by other interfaces, for example, a universal serial bus (USB A/B/C), an IEEE 1394 interface ("Firewire"), a Lightning port, a parallel port, or a game port, or wirelessly via Bluetooth protocol. A user may enter commands and information into the computer system 400 through various input devices including, for example, a keyboard 442 and pointing device 444, for example, a mouse. Other input devices (not shown) may include, for example, a joystick, a game pad, a tablet, a touch screen device, a scanner, a facsimile machine, a microphone, a digital camera, and a digital video camera. Additionally, audio and video devices such as a microphone 446, a video camera 448 (e.g., a webcam), and external speakers 450, may be connected to the system bus 404 through the serial port interface 440 with or without intervening specialized audio or video cards card or other media interfaces (not shown).

The computer system 400 may operate in a networked environment using logical connections through a network interface 452 coupled with the system bus 404 to communicate with one or more remote devices. The logical connections depicted in FIG. 4 include a local area network (LAN) 454 and a wide area network (WAN) 460. Such networking environments are commonplace in home networks, office networks, enterprise wide computer networks, and intranets. These logical connections may be achieved by a communication device coupled to or integral with the computer system 400. As depicted in FIG. 4, the LAN 454 may use a router 456 or hub, either wired or wireless, e.g., via IEEE 802.11protocols, internal or external, to connect with remote devices, e.g., a remote computer 458, similarly connected on the LAN 454. The remote computer 458 may be another personal computer, a server, a client, a peer device, or other common network node, and typically includes many or all of the elements described above relative to the computer system 400.

To connect with a WAN 460, the computer system 400 typically includes a modem 462 for establishing communications over the WAN 460. Typically the WAN 460 may be the Internet. However, in some instances the WAN 460 may be a large private network spread among multiple locations, or a virtual private network (VPN). The modem 462 may be a telephone modem, a high-speed modem (e.g., a digital subscriber line (DSL) modem), a cable modem, or similar type of communications device. The modem 462, which may be internal or external, is connected to the system bus 418 via the network interface 452. In alternate embodiments the modem 462 may be connected via the serial port interface 444. It should be appreciated that the network connections shown are exemplary and other means of and communications devices for establishing a network communications link between the computer system and other devices or networks may be used.

Figure 5:
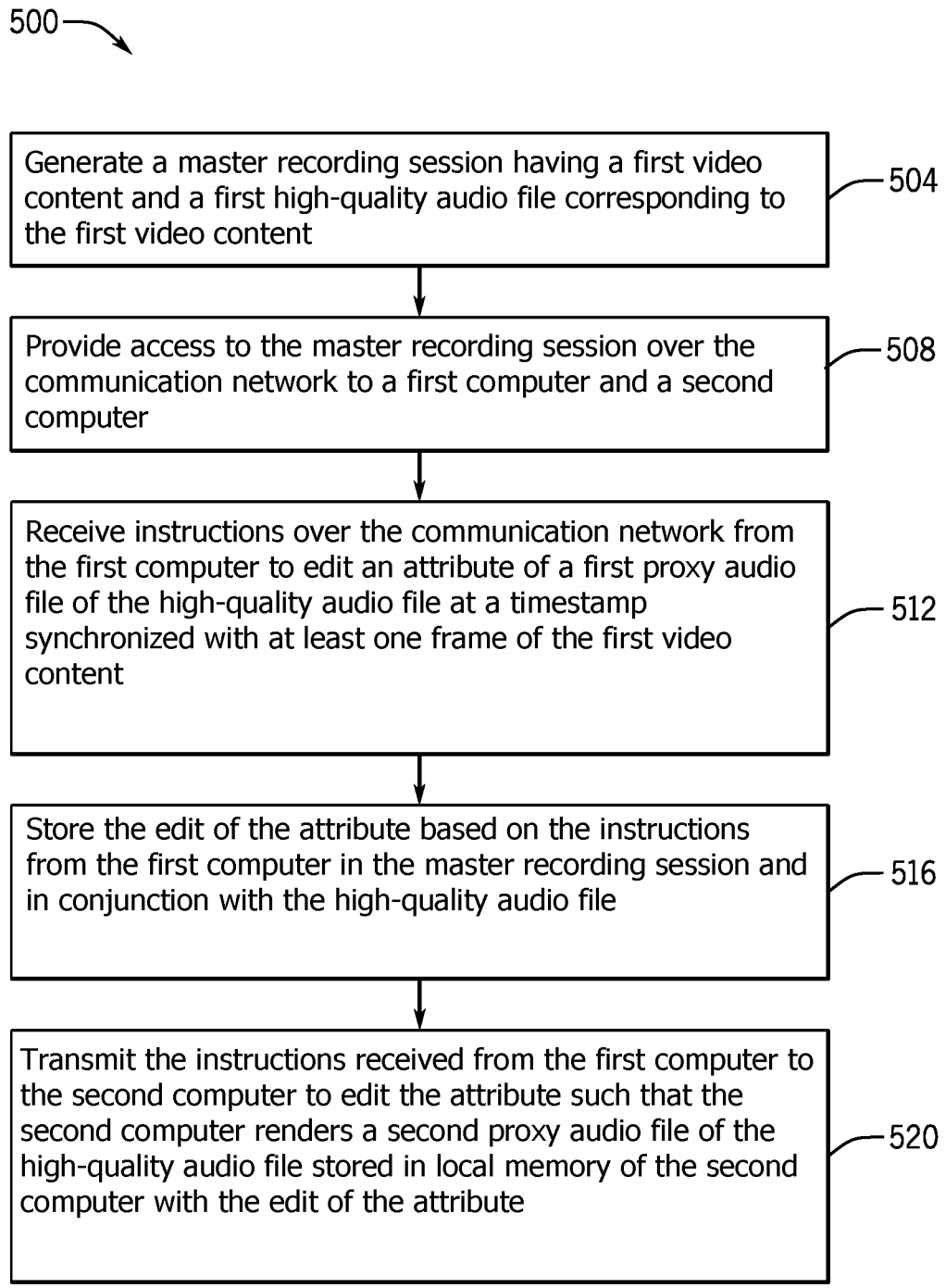
FIG. 5 depicts a flow diagram for a method for editing a remote audio recording session performed by a server computer.
Figure 6:
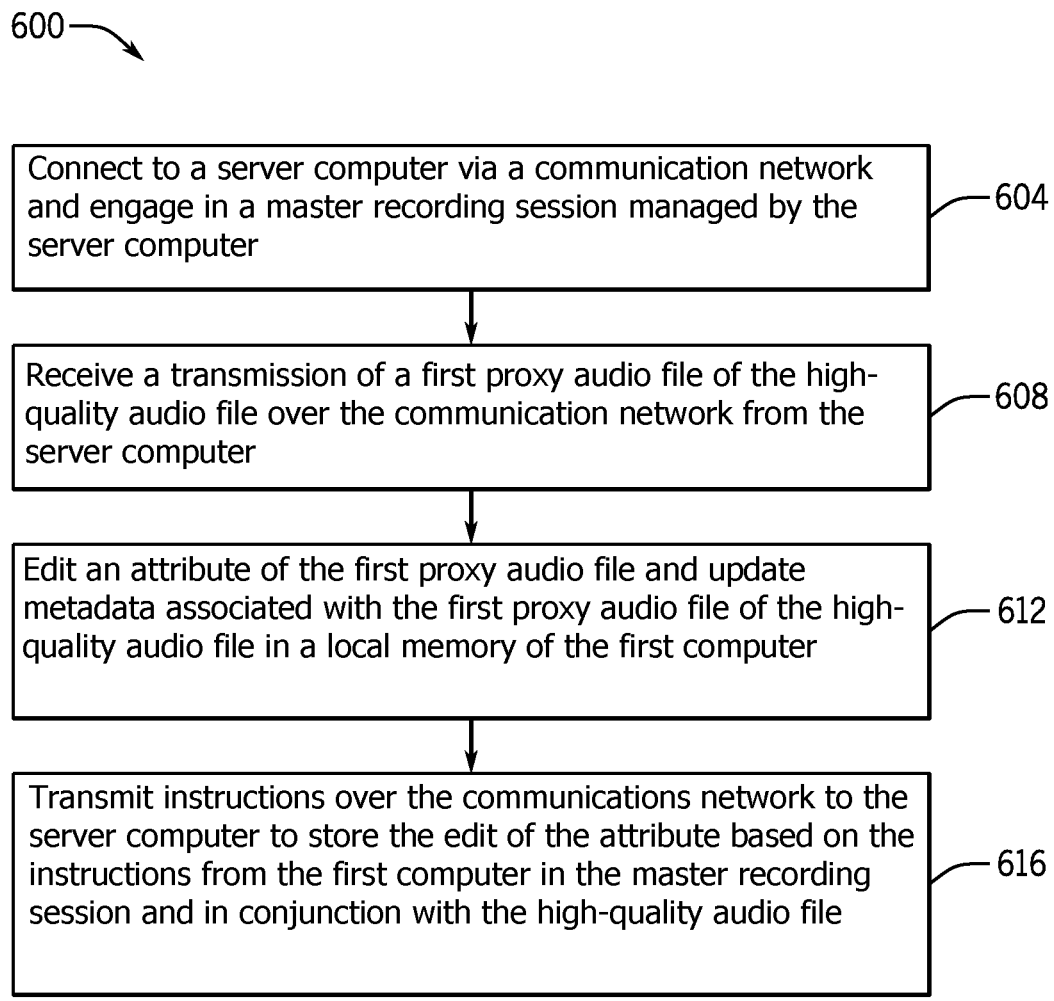
FIG. 6 depicts a flow diagram for a method for editing a remote audio recording session on a first computer associated with a first user.

To facilitate the reader's understanding of the various functionalities of the embodiments discussed herein, reference is now made to the flow diagram in FIGS. 5 and 6, which illustrates processes 500 and 600. While specific steps (and orders of steps) of the methods presented herein have been illustrated and will be discussed, other methods (including more, fewer, or different steps than those illustrated) consistent with the teachings presented herein are also envisioned and encompassed with the present disclosure.

With reference to FIG. 5, the process 500 is shown that is related to a method for editing a remote audio recording session performed by a server computer. At operation 504, a master recording session is generated. The master recording session includes a first video content (e.g., a video clip) and a first high-quality audio file corresponding to the first video content. The master recording session is stored in a central database accessible by a server computer. For example, and with reference to FIGS. 2 and 3, the master recording session may be stored on the server 380. The first high-quality audio file may correspond to a recording of a voice actor that is recorded at a client device over the communications network. In this regard, the first high-quality audio file may be associated with a timestamp that associates the high-quality audio file with a particular portion of the first video clip. The method 500 may direct the server to store editing instructions related to the first high-quality audio file received from a remote user, such as a controller user, and propagate information associated with the edits (e.g., metadata) to compressed, proxy versions of the file stored on local devices throughout the network.

At operation 508, access is provided to the master recording session over the communication network to a first computer and a second computer. The first computer and the second computer may be at different physical locations from each other and the server computer. For example, and with reference to FIGS. 2 and 3, the controller device 208 and actor devices 216a-216b may be provided access to the master session 204 by the server 102. Providing access to the master session 204 may include transmitting information to one or more remote devices including a rendering of the master recording session for storage locally. For example, and as described herein, the master session 204 may not necessarily be downloaded, or be downloadable, by the remote users. Rather, the server 102 can selectively send information over the communications network the remote client device. The information can include a compressed version of the high-quality audio file as a proxy file. The transmitted information to the local computers can also include one or more or all of the attributes or states of the master recording session described herein, including a track characteristic, an audio clip characteristic, a script event characteristic, a video characteristic and/or other characteristics, as described herein.

At operation 512, instructions are received over the communication network from the first computer to edit an attribute of a first proxy audio file of the high-quality audio file at a timestamp synchronized with at least one frame of the first video clip. For example, and with reference to FIG. 3, the first local session 304 may provide an environment in which a first, controller user causes an edit to an attribute of a first proxy audio file of the high-quality audio file, such as an edit to metadata associated with the first proxy audio file. The first local session 304 may allow the first, controller user to edit an attribute at a particular timestamp that is synchronized with at least one frame of a first video clip. In the method 500, the server 380 may receive instructions from the communications component 320 regarding the edit to the attribute of the first proxy audio file. Upon receipt, the server 380 has information that can allow for updates to attributes of the master recording session based on the local edits of the first user.

At operation 516, edits of the attribute are stored in conjunction with the high-quality audio file of the master recording session using the instructions from the first computer to edit the attribute. For example, and with reference to FIG. 3, the server 380 may be configured to store the edit information related to the attribute of the first proxy audio file with the master session, as stored in the database 384. Upon receipt of the instructions from the first computer, the server 380 may be configured to cause the attribute of the master recording session to update accordingly. For example, the instructions received from the first computer may involve changing an audio property of the recording from a first value to the second value. The instructions received from the first computer may indicate that the first computer has changed, locally, metadata of a first proxy audio file to include the edited attribute of the audio property having the second value, from the first value. Accordingly, the server may process and analyze the instructions to change the corresponding attribute of the master recording session to also have the second value of the audio property. In this regard, the metadata of the master recording session is edited in response to the local edits of the first user of a compressed version of the audio file.

At operation 520, instructions received from the first computer are transmitted to the second computer to edit the attribute such that the second computer updates metadata related to a second proxy audio file of the high-quality audio file stored in a local memory of the second computer. For example, and with reference to FIG. 3, the server 380 may be configured to communicate the change to the master recording session to the second local session 354. As described above, the second computer of the second local session 354 may already possess a second proxy audio file of the master recording session. The second proxy audio file may include information indicative of the same first high-quality audio file as of the first proxy audio file. Upon the change by the server 380 of the master session to include the edited attribute, the second proxy audio file and associated metadata may be out of date. For example, the second proxy audio file may not include metadata indicative of the edit to the attribute, such as the change in the audio property from the first value to the second value. Accordingly, the server 380 may transmit instruction to the second local session 354 that cause a second computer or browser program 362 operating thereon to render the second proxy audio file to include the edited attribute, for example, by causing the metadata associated with the second proxy audio file to be updated. This in turn may cause the browser program to display locally the second proxy audio file having the edited attribute.

In some cases, the operations 504-520 may occur during or otherwise without impairment from, the server 380 initiating one or more recording functions on a remote client device to record additional high-quality audio for the master recording session. As one example, the server 380 may receive instructions over the communication network from the first local session 304 or another local session to initiate a recording function in the second local session 354. In turn, the server 380 may transmit such instructions to the second local session 354. The server 380 may further receive from the second local session 354 a second high-quality audio file recording of sound created by a second user corresponding to a second video clip record by the second computer. The second high-quality audio file may be stored in local memory on the second computer before transmission to the server computer 380. The second high-quality audio file includes a second timestamp synchronized with another at least one frame of the second video clip different than the at least one frame of the first video clip. Accordingly, the receiving of the second high-quality audio file recording of sound created by the second user can occur substantially concurrently with the receiving instructions over the communication network from the first computer to edit an attribute of the first proxy audio file to promote the multi-user functionality described herein.

With reference to FIG. 6, the process 600 is shown that is related to a method for editing a remote audio recording session on a first computer or otherwise on a client device. At operation 604, a first or client computer is connected to a server computer via a communications network. The first computer is engaged with the master recording session managed by the server computer. The master recording session includes a video clip and a high-quality audio file corresponding to the video clip that are each stored in a central database accessible by the server computer. For example, and with reference to FIGS. 2 and 3, the master recording session may be stored on the server 380. The first high-quality audio file may correspond to a recording of a voice actor that is recorded at a client device over the communications network. In this regard, the first high-quality audio file may be associated with a timestamp that associates the high-quality audio file with a particular portion of the first video clip. The method 600 may allow the first computer to edit the first high-quality audio file indirectly, by first editing metadata of a local, first computer compressed, proxy version of the file.

For example, at operation 608, a transmission is received including a first proxy audio file of the high-quality audio file over the communication network from the server computer. For example, and with reference to FIGS. 2 and 3, the master session may not necessarily be downloaded or downloadable by the remote user, such as the first user of the first local session 304. Rather, the first user may receive at the first local session 304 state information over the communications network from the server 380. The received information can also include one or more or all of the attributes or states of the master recording session described herein, including a track characteristic, an audio clip characteristic, a script event characteristic, a video characteristic and/or other characteristics, as described herein.

At operation 612, an attribute of the first proxy audio file is edited such that first metadata associated with the proxy audio file of the high-quality audio file is updated in a local memory of the first computer. For example, and with reference to FIG. 3, the first local session 304 may provide an environment in which the first, controller user causes an edit to an attribute of a first proxy audio file of the high-quality audio file. The first local session 304 may allow the first, controller user to edit an attribute at a particular timestamp that is synchronized with at least one frame of a first video clip. In the method of 600, metadata describing the edit of the first proxy audio file may be communicated to the server 380 via the communications component 320. The communication instruction to the server 380 may allow the server 380 to update the attributes of the master recording session based on the local edits of the first user in the first local session 304.

At operation 616, instructions are transmitted over the communications network to the server computer to include the edit of the attribute into the high-quality audio file of the master recording session of the server computer, such as including the edit to the associated metadata. For example, and with reference to FIG. 3, instructions transmitted from the first local session 304 may cause the server 380 to include metadata of the edit of the attribute of the first proxy audio file with the master session, as stored in the database 384. The instructions from the first local session 304 may cause the attribute of the master recording session to update accordingly. For example, the instructions received from the first computer may involve changing an audio property of the recording from a first value to the second value. The instructions received from the first computer may indicate that the first computer changed, locally, metadata associated with a first proxy audio file to include the edited attribute of the audio property having the second value from the first value. Accordingly, the server may process and analyze the instructions to change the corresponding attribute and/or metadata of the master recording session to also have the second value of the audio property. In this regard, the metadata of the master recording session is edited in response to the local edits of the first user of a compressed version of the audio file.

In some cases, the instructions transmitted from the first local session 304 may cause the server 380 to render a second proxy audio file of the high-quality audio file stored in local memory of the second computer with the edit of the attribute from the first computer. For example, as described above, the second computer of the second local session 354 may already possess a second proxy audio file of the master recording session. The second proxy audio file may include information indicative of the same first high-quality audio file as of the first proxy audio file. Upon the receipt of the instructions from the first session 304, the second proxy audio file and associated metadata may be out of date. For example, the second proxy audio file may not include the edit to the attribute, such as the change in the audio property from the first value to the second value. Accordingly, instructions that are transmitted by the first computer may cause the server 380 may transmit instruction to the second local session 354 that cause a second computer or browser program 362 operating thereon to render the second proxy audio file to include the edited attribute, such as by causing the associated metadata to be updated. This in turn may cause the browser program to display locally the second proxy audio file having the edited attribute.

The technology described herein may be implemented as logical operations and/or modules in one or more systems. The logical operations may be implemented as a sequence of processor implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of exemplary embodiments of the invention as defined in the claims. Although various embodiments of the claimed invention have been described above with a certain degree of particularity, or with reference to one or more individual embodiments, other embodiments using different combinations of elements and structures disclosed herein are contemplated, as other iterations can be determined through ordinary skill based upon the teachings of the present disclosure. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method for editing a remote audio recording session performed by a server computer connected to a plurality of user computers over a communication network, the method comprising:
   generating a master recording session comprising a first video content and a first high-quality audio file corresponding to the first video content, stored in a central database accessible by the server computer;
   providing access to the master recording session over the communication network to a first computer corresponding to a first user and a second computer corresponding to a second user, wherein the first computer and the second computer are at different physical locations from each other and from the server computer;
   receiving instructions over the communication network from the first computer to edit an attribute of a first proxy audio file of the first high-quality audio file at a timestamp synchronized with at least one frame of the first video content;
   storing the edit of the attribute based on the instructions from the first computer in the master recording session and in conjunction with the first high-quality audio file;
   transmitting the instructions received from the first computer to the second computer to edit the attribute such that the second computer renders a second proxy audio file of the first high-quality audio file stored in local memory of the second computer with the edit of the attribute.

2. The method of claim 1, before receiving instructions over the communication network from the first computer to edit the attribute of the first high-quality audio file, generating the first proxy audio file of the first high-quality audio file and sending the first proxy audio file to the first computer for local storage on the first computer, and wherein the instructions for the edit to the attribute are generated using the first proxy audio file.

3. The method of claim 2, wherein the edit of the attribute is associated with the timestamp by the first computer.

4. The method of claim 1, wherein
   merging the edit of the attribute into the master recording session generates updated metadata of the master recording session, and
   the method further comprises storing the updated metadata in the central database.

5. The method of claim 1, wherein the attribute comprises a track characteristic, an audio clip characteristic, a script event characteristic, or a video characteristic.

6. The method of claim 1, further comprising
   receiving instructions over the communication network from the first computer or a third computer to initiate a recording function on the second computer,
   transmitting the instructions received from the first computer or the third computer to the second computer to initiate the recording function at the second computer, and
   receiving from the second computer a second high-quality audio file recording of sound created by the second user corresponding to a second video clip record by the second computer and stored in local memory on the second computer before transmission to the server computer, wherein the second high-quality audio file includes a second timestamp synchronized with another at least one frame of the second video clip different than the at least one frame of the first video clip.

7. The method of claim 6, wherein receiving the second high-quality audio file recording of sound created by the second user occurs substantially concurrently with the receiving instructions over the communication network from the first computer to edit an attribute of the first proxy audio file.

8. The method of claim 6, wherein receiving instructions over the communication network from the first computer or the third computer to initiate a recording function on the second computer further comprises
   receiving instructions over the communication network from the first computer or the third computer to active a microphone and begin playback of the video clip on the second computer; and
   wherein transmitting the instructions received from the first computer or the third computer to the second computer to initiate the recording function at the second computer further comprises
   transmitting the instructions received from the first computer or the third computer to the second computer to activate the microphone and begin playback of the video clip.

9. The method of claim 8, further comprising
   receiving instructions from the first computer or the third computer to deactivate the microphone, halt playback of the video clip, and cease the recording function on the second computer; and transmitting the instructions received from the first computer or the third computer to the second computer to deactivate the microphone, halt playback of the video clip, and cease the recording function on the second computer.

10. The method of claim 6, wherein receiving the second high-quality audio file further comprises receiving the second high-quality audio file in segments serially and at least partially during playback of the video clip.

11. The method of claim 1, wherein the high-quality audio file is recorded at a sample rate of at least 48 kHz and a resolution of at least 24 bits per sample.

12. A method for editing a remote audio recording session on a first computer associated with a first user, the method comprising:
   connecting to a server computer via a communication network and engaging in a master recording session managed by the server computer, wherein the master recording session comprises a video clip and a high-quality audio file corresponding to the video clip that are stored in a central database accessible by the server computer;
   receiving a transmission of a first proxy audio file of the high-quality audio file over the communication network from the server computer;
   editing an attribute of the first proxy audio file and updating metadata associated with the first proxy audio file of the high-quality audio file in a local memory of the first computer; and
   transmitting instructions over the communications network to the server computer to store the edit of the attribute based on the instructions from the first computer in the master recording session and in conjunction with the high-quality audio file.

13. The method of claim 12, further comprising synchronizing the edit of the attribute to a timestamp of at least one frame of the video clip.

14. The method of claim 13, wherein transmitting instructions over the communications network to the server computer to merge the edit of the attribute into the high-quality audio file of the master recording session of the server computer further comprises transmitting the timestamp to the server computer.

15. The method of claim 14, wherein the transmitted instructions of the first computer cause the server computer to merge the edit of the attribute according to the timestamp.

16. The method of claim 12, wherein the editing of the attribute of the high-quality audio file occurs in response to a manual input received from the first user within a browser program of the first computer.

17. The method of claim 12, wherein the attribute comprises a track characteristic, an audio clip characteristic, a script event characteristic, or a video characteristic.

18. The method of claim 12, wherein the transmitted instructions of the first computer cause the server computer to
   generate updated metadata of the master recording session based on the transmitted instructions of the first computer, and
   store the updated metadata in the central database.

19. The method of claim 12, wherein
   the master recording session is accessed over the communication network by a second computer corresponding to a second user;
   the first computer and the second computer are at different physical locations from each other and from the server computer; and
   the transmitted instructions of the first computer cause the server computer to transmit instructions over the communications network to the second computer to render a second proxy audio file of the high-quality audio file stored in local memory of the second computer with the edit of the attribute from the first computer.

20. The method of claim 19, wherein transmitted instructions of the first computer cause the server computer to transmit instructions over the communications network to the second computer to render the second proxy audio file of the high-quality audio file while the second computer generates another high-quality audio file for the master recording session.

* * * * *